3,426,045
7-HALO AND 6-HALO, 6-DEHYDRO-A-
NORPROGESTERONE
Patrick A. Diassi, Westfield, N.J., assignor to E. R. Squibb
 & Sons, Inc., New York, N.Y., a corporation of
 Delaware
No Drawing. Filed May 26, 1964, Ser. No. 370,355
U.S. Cl. 260—348                          10 Claims
Int. Cl. C07c *171/06, 173/00*

This invention relates to and has as its objects the provision of new physiologically active steroids, processes for their production and novel intermediates useful in the preparation thereof.

More particularly, this invention relates to steroids of the formula

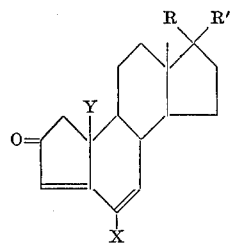

wherein Y is hydrogen or lower alkyl (e.g., methyl); X is halogen, (e.g., chloro or bromo); R is selected from the group consisting of hydroxy and acyloxy; R' is selected from the group consisting of hydrogen and lower alkyl (e.g., methyl and ethyl); and together R and R' is oxo (O=).

The preferred acyl radicals of this invention are those of hydrocarbon carboxylic acids of less than ten carbon atoms as exemplified by such acids as the lower alkanoic acids, the lower alkenoic acids, the monocyclic aryl carboxylic acids, the monocyclic aryl lower alkanoic acids (e.g., phenacetic and phenylpropionic acids), the cycloalkane carboxylic acids, and the cycloalkene carboxylic acids.

The compounds of this invention may be prepared according to the processes of this invention, beginning with A-nortestosterone and its 17-substituted derivatives. The A-nortestosterone starting materials may be prepared according to the procedures set forth in prior applications, Ser. No. 684,787, filed Sept. 24, 1957, now Patent No. 2,968,216, in the name of Frank L. Weisenborn and Ser. No. 766,363, filed Oct. 9, 1958, now Patent No. 3,210,406, in the name of Frank L. Weisenborn.

The starting material may be first treated with a halogenating agent, for example, 2,3-dichloro-5,6-dicyanobenzoquinone and a hydrogen halide, for example, hydrogen chloride or hydrogen bromide to yield the 7-halo derivative of the respective starting material, which are new compounds of this invention.

The 7-halo derivatives may then be dehydrogenated, as by treatment with an organic base, for example, collidine, at elevated temperatures, to yield the 6-dehydro derivatives of the respective starting materials, which are also new compounds of this invention.

The 6-dehydro derivatives may then be oxidized as by treatment with a perbenzoic acid, for example, m-chloroperbenzoic acid, to yield the 6α,7α-oxido derivatives of the respective starting materials, also new compounds of the instant invention.

The 6α,7α-oxido derivatives may then be treated with an excess of a hydrohalide, e.g., hydrogen chloride or hydrogen bromide, at an elevated temperature to yield directly, the respective 6-halo-6-dehydro final products of this invention.

Alternatively, the 6-halo-6-dehydro final products may be prepared by first treating the 6α,7α-oxido derivatives with one molar equivalent of a hydrohalide, e.g., hydrogen chloride or hydrogen bromide, at reduced temperatures, to yield the 6-halo-7-hydroxy derivatives, which are new compounds of this invention. These 6-halo-7-hydroxy derivatives may then be treated with an excess of hydrogen halide, at an elevated temperature to yield the 6-halo-6-dehydro final products of this invention.

The compounds of this invention may be utilized in various ways including in admixture with a suitable carrier or carriers. The compounds of this invention possess anabolic activity and hence may be used in place of such known anabolic steroids as 17-ethyl-19-nortestosterone in the treatment of post-operative shock and other conditions where tissue degeneration has occurred. Administration of the products of this invention may be accomplished either perorally or parenterally, the dosage and/or concentration being adjusted for the relative potency of the particular steroid.

The invention may be further illustrated by the following examples:

Example 1.—7α-chloro-A-nortestosterone

To a solution of 176 mg. of A-nortestosterone in 6.4 ml. of dried dioxane 160 mg. of 2,3-dichloro-5,6-dicyanobenzoquinone are added and into the resulting solution a stream of hydrogen chloride gas is bubbled for thirty seconds. The reaction mixture is then left at room temperature for sixteen hours during which time crystals of 2,3-dichloro-5,6-dicyanohydroquinone separate. The mixture is then filtered, washed with dioxane and the filtrate evaporated to dryness, in vacuo. The residue is dissolved in chloroform and plate chromatographed using Woelm neutral alumina (Activity 5) as adsorbant and chloroform as developing solvent. Detection of the band having R$f$ approximately 0.6 and elution with ethyl acetate followed by evaporation of the solvent, in vacuo, gives a residue which on crystallization from acetone-hexane yields 50 mg. of 7α-chloro-A-nortestosterone having a melting point of 212–214° C., $[\alpha]_D^{22}$—33.7° (chloroform).

$\lambda_{max.}^{alc.}$ 232 m$\mu$ ($\epsilon$, 16,400)

Analysis.—Calc'd for $C_{18}H_{25}O_2Cl$ (308.84): C, 70.00; H, 8.16; Cl, 11.48. Found: C, 70.65; H, 8.39; Cl, 12.00.

Similarly, following the above procedure but substituting equivalent amounts of 17α-methyl-A-nortestosterone; 17α-ethyl-A-nortestosterone; A,19-bisnortestosterone; 17α-methyl-A, nortestosterone; 17α-ethyl-A,19-bisnortestosterone, the 17-ester of these compounds, for example, A-nortestosterone, 17-acetate; 17α-methyl - A - nortestosterone 17β-acetate; A,19-bisnortestosterone 17β-acetate and other like esters; A-nor-Δ³-androstene-2,17-dione; and A,19-bisnor-Δ³-androstene-2,17-dione for A-nortestosterone, there is obtained the respective 7α-chloro derivative thereof.

Example 2.—7α-bromo-A-nortestosterone

Following the procedure of Example 1 but substituting hydrogen bromide for hydrogen chloride there is obtained 7α-bromo-A-nortestosterone.

Example 3.—6-dehydro-A-nortestosterone

A solution of 183.8 mg. of 7α-chloro-A-nortestosterone in 5 ml. of collidine is refluxed for one hour. After cooling it is diluted with chloroform and washed successively with 2 N hydrochloric acid, water, 5% sodium bicarbonate and water, then evaporated to dryness, in vacuo. The residue on plate chromatography using Woelm neutral alumina (Activity V) and chloroform as developing solvent gives a band detectable by ultraviolet at R$f$ approximately .7 which on elution with ethyl acetate, evaporation of the solvent, in vacuo. Crystallization of the residue from acetone-hexane yields 6-dehydro-A-nortestosterone having melting point 219–221° C., $[\alpha]_D^{22}+63.3°$ (chloroform), $\lambda_{max.}^{alc.}$ 276 m$\mu$ ($\epsilon$, 23,000)

*Anal.*—Calc'd for $C_{18}H_{24}O_2$ (272.37): C, 79.37; H, 8.88. Found: C, 79.46; H, 8.96.

Similarly, the 7α-chloro derivatives prepared in Example 1 may also be treated by the above procedure to yield the respective 6-dehydro derivatives.

Example 4.—6α,7α-oxido-A-nortestosterone

A solution of 225 mg. of 6-dehydro-A-nortestosterone in 25 ml. of methylene chloride is cooled to 0° C. and 450 mg. of metachloroperbenzoic acid is added in small portions. The reaction mixture is kept at 0° C. for thirty minutes then allowed to come to room temperature and left stirring for sixty-four hours. The solution is then washed with 5% sodium bicarbonate, 5% sodium sulfite, and water and then evaporated to dryness in vacuo. The residue on plate chromatography using Woelm neutral alumina (Activity V) as adsorbant and chloroform as developing solvent gives a major band at R$f$ 0.5 which is detectable by ultraviolet and is eluted with ethyl acetate. The ethyl acetate is evaporated to dryness in vacuo to give a residue which on crystallization from acetone-hexane gives 120 mg. of 6α,7α-oxido-A-nortestosterone having melting point 172–174° C., $[\alpha]_D^{22}+8.5°$ (chloroform)

$\lambda_{max.}^{alc.}$ 234 m$\mu$ ($\epsilon$, 13,500)

*Anal.*—Calc'd for $C_{18}H_{24}O_3$: C, 74.97; H, 8.39. Found: C, 74.80; H, 8.25.

Similarly, the other 6-dehydro derivatives prepared according to Example 3 may also be treated by the above procedure to yield the respective 6α,7α-oxido derivatives.

Example 5.—6β-chloro-7α-hydroxy-A-nortestosterone

To a cold solution of 100 mg. (0.348 mmoles) of 6α,7α-oxido-A-nortestosterone in 10 ml. of chloroform is added dropwise 0.93 ml. of a solution of hydrogen chloride in chloroform containing 50 mg. of hydrochloric acid per ml. The resulting solution is kept at 0° for 2½ hours then diluted with water. The chloroform is separated and the aqueous portion extracted with chloroform. The combined chloroform extracts are then washed with water until neutral and evaporated to dryness in vacuo. Crystallization of the residue from acetone-hexane gives 87 mg. of 6β-chloro-7α-hydroxy-A-nortestosterone having melting point of 212–214° C., $[\alpha]_D^{22}-52.7°$ (ethanol), $\lambda_{max.}^{alc.}$ 234 m$\mu$ ($\epsilon$, 13,400)

*Anal.*—Calc'd for $C_{18}H_{25}O_3Cl$: C, 66.56; H, 7.76; Cl, 10.91. Found: C, 66.50; H, 7.73; Cl, 10.82.

Similarly, the other 6α,7α-oxido derivatives obtained in Example 4 may be treated in accordance with the above procedure to yield the respective 6β-chloro-7α-hydroxy derivatives.

Example 6.—6β-bromo-7α-hydroxy-A-nortestosterone

Following the procedure of Example 5 however substituting hydrogen bromide in acetic acid for the hydrogen chloride in the chloroform there is obtained 6β-bromo-7α-hydroxy-A-nortestostertone.

Example 7.—6-chloro-6-dehydro-A-nortestosterone

A solution of 36 mg. of 6β-chloro-7α-hydroxy-A-nortestosterone in 5 ml. of chloroform is saturated with hydrogen chloride gas and the mixture heated at 40–45° C. for twenty-two hours. The solution is washed with 5% sodium bicarbonate with water until neutral and then evaporated to dryness, in vacuo. Chromatography of the residue on Woelm neutral alumina (Activity V) using ethyl acetate chloroform (1:9, v.:v.) as eluting solvent gives on evaporation and crystallization of the residue 11 mg. of 6-chloro-6-dehydro-A-nortestosterone having melting point 164–166° C., $[\alpha]_D+47.9°$ C. (chloroform), $\lambda_{max.}^{alc.}$ 279 m$\mu$ ($\epsilon$, 21,000)

*Anal.*—Calc'd for $C_{18}H_{23}O_2Cl$ (306.82): C, 70.45; H, 7.83. Found: C, 71.00; H, 7.30.

Similarly, the other 6β-chloro-7α-hydroxy derivatives obtained in Example 5 may be treated in accordance with the above procedure to yield the respective 6-chloro-6-dehydro derivatives.

Example 8.—6-bromo-6-dehydro-A-nortestosterone

Following the procedure of Example 7 but substituting hydrogen bromide for the hydrogen chloride there is obtained 6-bromo-6-dehydro-A-nortestosterone.

Example 9.—6-chloro-6-dehydro-A-nortestosterone

Following the procedure set forth in Example 7, but substituting an equivalent amount of 6α,7α-oxide-A-nortestosterone for 6β-chloro-7α-hydroxy-A-nortestosterone, there is obtained 6-chloro-6-dehydro-A-nortestosterone.

The invention may be variously otherwise embodied within the scope of the appended claims.

What is claimed is:

1. A compound of the formula

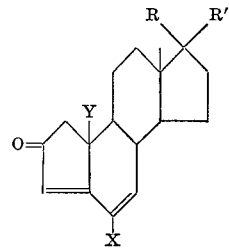

wherein Y is selected from the group consisting of hydrogen and lower alkyl; X is halogen; R' is selected from the group consisting of hydrogen and lower alkyl; R is selected from the group consisting of hydroxy and acyloxy wherein acyl is a hydrocarbon carboxylic acid of less than ten carbons; and together R and R' is oxo (O=).

2. A compound of the formula

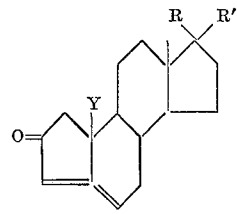

wherein Y is selected from the group consisting of hydrogen and lower alkyl; R is selected from the group consisting of hydroxy and acyloxy wherein the acyl is a hydrocarbon carboxylic acid of less than twelve carbons; R' is selected from the group consisting of hydrogen and lower alkyl; and together R and R' is oxo (O=).

3. A compound of the formula

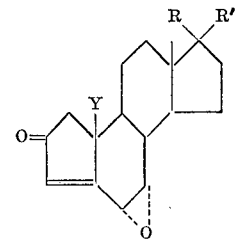

wherein Y is selected from the group consisting of hydrogen and lower alkyl; R is selected from the group consisting of hydroxy and acyloxy wherein the acyl is a hydrocarbon carboxylic acid of less than twelve carbons; R' is selected from the group consisting of hydrogen and lower alkyl; and together R and R' is oxo (O=).

4. A compound of the formula

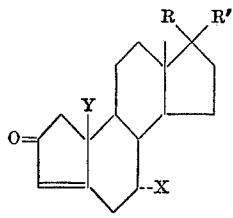

wherein Y is selected from the group consisting of hydrogen and lower alkyl; X is halogen; R is selected from the group consisting of hydroxy and acyloxy wherein the acyl is a hydrocarbon carboxylic acid of less than twelve carbons; R' is selected from the group consisting of hydrogen and lower alkyl; and together R and R' is oxo (O=).

5. 7α-chloro-A-nortestosterone.
6. 7α-bromo-A-nortestosterone.
7. 6-dehydro-A-nortestosterone.
8. 6α,7α-oxido-A-nortestosterone.
9. 6-chloro-6-dehydro-A-nortestostrone.
10. 6-bromo-6-dehydro-A-nortestosterone.

References Cited

UNITED STATES PATENTS 3,236,880   2/1966   Berk et al. _____ 260—586

LEON ZITVER, *Primary Examiner.*

MATTHEW M. JACOB, *Assistant Examiner.*

U.S. Cl. X.R.

260—586, 410, 468, 476, 486, 488, 999

PO-1050
(5/69)

UNITED STATES PATENT OFFICE
CERTIFICATE OF CORRECTION

Patent No. 3,426,045     Dated February 4, 1969

Inventor(s) Patrick A. Diassi

It is certified that error appears in the above-identified patent and that said Letters Patent are hereby corrected as shown below:

It is certified that error appears in the above-identified patent and that said Letters Patent are hereby corrected as shown below:

Column 1, lines 47 and 48, "Ser. No. 684,787, filed Sept. 24, 1957, now Patent No. 2,968,216" should read -- Ser. No. 685,787, filed Sept. 24, 1957, now abandoned, --. Column 4, line 16, "oxide" should be -- oxido --; in the Formula of Claim 2, the formula should appear as follows:

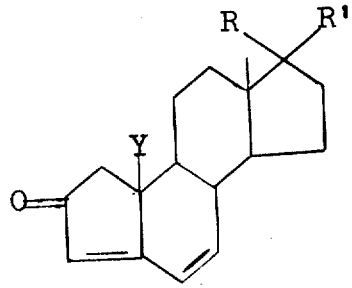

SIGNED AND
SEALED
MAY 26 1970

(SEAL)
Attest:

Edward M. Fletcher, Jr.
Attesting Officer

WILLIAM E. SCHUYLER, JR.
Commissioner of Patents